(12) United States Patent
Kinoshita et al.

(10) Patent No.: US 10,099,389 B2
(45) Date of Patent: Oct. 16, 2018

(54) INDUSTRIAL ROBOT COMPRISING DRIVE SHAFT PROVIDED WITH BRAKE UNIT

(71) Applicant: FANUC CORPORATION, Yamanashi (JP)

(72) Inventors: Satoshi Kinoshita, Yamanashi (JP); Ryuji Takikawa, Yamanashi (JP); Shinya Chikara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/643,037

(22) Filed: Mar. 10, 2015

(65) Prior Publication Data

US 2015/0258681 A1    Sep. 17, 2015

(30) Foreign Application Priority Data

Mar. 12, 2014  (JP) .................................. 2014-048885

(51) Int. Cl.
  *B25J 17/00* (2006.01)
  *B25J 19/00* (2006.01)
  *B25J 19/06* (2006.01)

(52) U.S. Cl.
  CPC ......... *B25J 19/0004* (2013.01); *B25J 19/066* (2013.01); *Y10S 901/23* (2013.01); *Y10S 901/25* (2013.01); *Y10T 74/20317* (2015.01)

(58) Field of Classification Search
  CPC ....... B25J 9/102; B25J 19/0004; B25J 19/066
  USPC ............. 74/490.01, 490.02, 490.03, 490.05, 74/490.06; 901/23, 25
  See application file for complete search history.

(56) References Cited

U.S. PATENT DOCUMENTS

| | | | | |
|---|---|---|---|---|
| 4,831,316 A | * | 5/1989 | Ishiguro | G05B 19/425 318/573 |
| 4,964,503 A | * | 10/1990 | Nishiyama | B25J 9/104 192/12 D |
| 6,068,442 A | * | 5/2000 | Flemmer | B25J 9/042 414/744.5 |
| 6,484,067 B1 | * | 11/2002 | Kinoshita | B25J 19/0062 277/534 |
| 2006/0182608 A1 | * | 8/2006 | Kinoshita | B25J 9/042 414/744.5 |

(Continued)

FOREIGN PATENT DOCUMENTS

| | | |
|---|---|---|
| CN | 1744971 A | 3/2006 |
| CN | 102941578 A | 2/2013 |
| DE | 102006022889 A1 | 11/2007 |

(Continued)

OTHER PUBLICATIONS

English Translation of Japanese Publication No. 2014034108, published Feb. 24, 2014, 24 pages.

(Continued)

*Primary Examiner* — Zakaria Elahmadi
(74) *Attorney, Agent, or Firm* — Fredrikson & Byron, P.A.

(57) ABSTRACT

An industrial robot provided with a drive shaft in which a power transmission unit is arranged between a servomotor and a power output unit includes: a first brake unit integrally incorporated in the servomotor; and a second brake unit which is connected to the power transmission unit to branch to a power transmission path of the power transmission unit. The drive shaft is braked by using both the first brake unit and the second brake unit.

4 Claims, 6 Drawing Sheets

(56) References Cited

U.S. PATENT DOCUMENTS

2008/0056858 A1 3/2008 Tamura et al.
2013/0039730 A1 2/2013 Sueyoshi et al.

FOREIGN PATENT DOCUMENTS

| JP | 54189 A | 1/1993 |
| JP | 2000117671 A | 4/2000 |
| JP | 2000190093 A | 7/2000 |
| JP | 2004316722 A | 11/2004 |
| JP | 2009095939 A | 5/2009 |
| JP | 2010094749 A | 4/2010 |
| JP | 2012055981 A | 3/2012 |
| JP | 2013035098 A | 2/2013 |
| JP | 201434108 A | 2/2014 |
| JP | 2014034108 A | 2/2014 |

OTHER PUBLICATIONS

English Translation of Japanese Publication No. 2013035098, published Feb. 21, 2013, 32 pages.
English Translation of Japanese Publication No. 2012055981, published Mar. 22, 2012, 20 pages.
English Translation of Japanese Publication No. 2010094749, published Apr. 30, 2010, 13 pages.
English Abstract and Machine Translation for Japanese Publication No. 2014-034108 A, published Feb. 24, 2014, 20 pgs.
English Abstract and Machine Translation for Japanese Publication No. 2004-316722 A, published Nov. 11, 2004, 25 pgs.
English Abstract and Machine Translation for Japanese Publication No. 2000-190093 A, published Jul. 11, 2000, 11 pgs.
English Abstract and Machine Translation for Japanese Publication No. 2000-117671 A, published Apr. 25, 2000, 10 pgs.
English Abstract and Machine Translation for Chinese Japanese Publication No. 102941578 A, published Feb. 27, 2013, 5 pgs.
English Abstract and Machine Translation for Chinese Publication No. 1744971 A, published Mar. 8, 2006, 7 pgs.
English Abstract and Machine Translation for German Publication No. 102006022889 A1, published Nov. 22, 2007, 8 pgs.
English Abstract and Machine Translation for Japanese Publication No. JPH05-004189 A, published Jan. 14, 1993, 6 pgs.
English abstract and machine translation for Japanese Publication No. JP 2009-095939 published May 7, 2009, 7 pgs.

\* cited by examiner

PRIOR ART

FIG. 10

Prior Art

INDUSTRIAL ROBOT COMPRISING DRIVE SHAFT PROVIDED WITH BRAKE UNIT

BACKGROUND OF THE INVENTION

1. Technical Field

The present invention relates to an industrial robot comprising a drive shaft provided with a brake unit.

2. Description of Related Art

Figure 9:
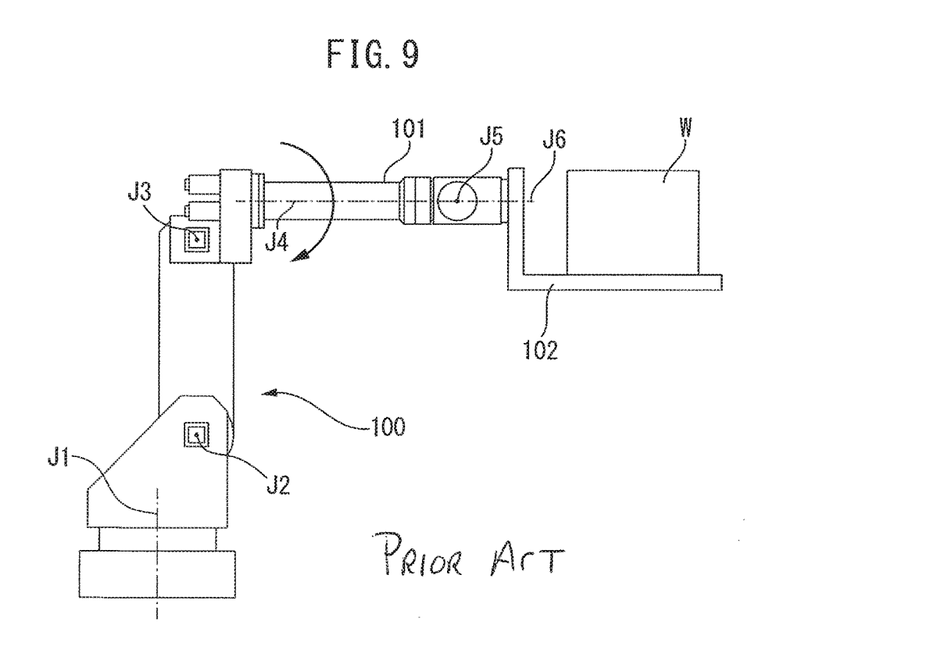
FIG. 9 is a side view of a common industrial robot.

FIG. 9 is a side view of a common industrial robot. An industrial robot 100 as illustrated in FIG. 9 is a 6-axis vertically articulated robot, which includes six drive shafts J1 to J6. A hand 102 for holding or placing a workpiece W is attached to the tip of a robot arm 101. By appropriately driving the six drive shafts, the hand 102 is moved to a desired position, thereby carrying the workpiece W.

Figure 10:
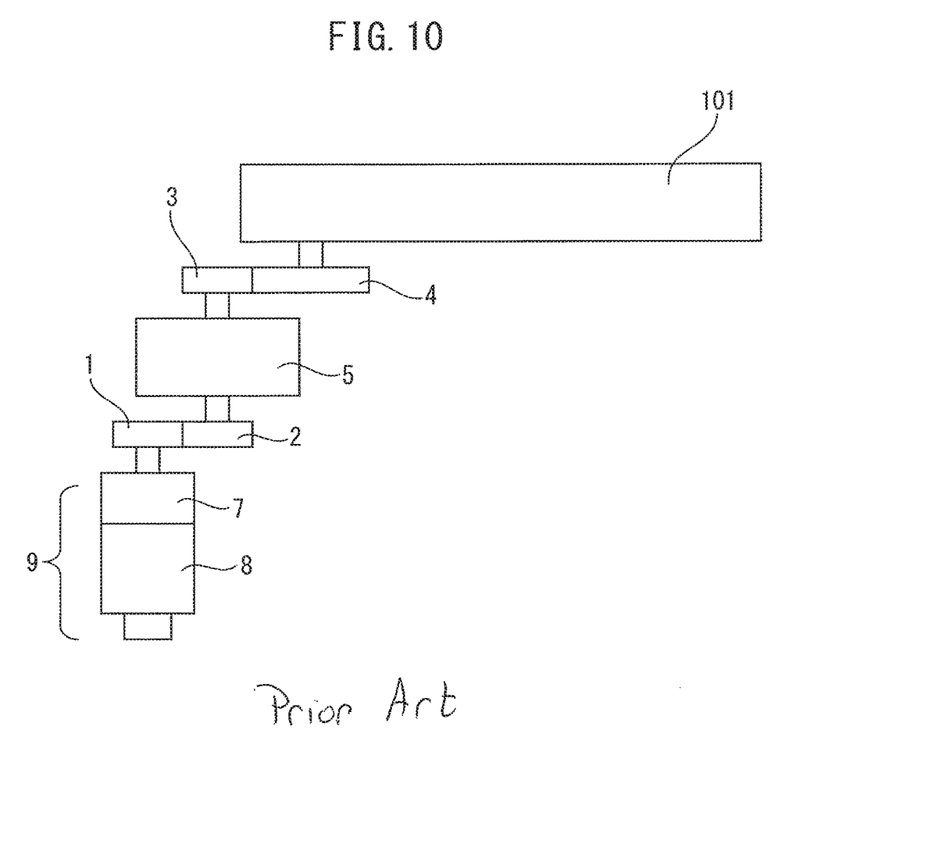
FIG. 10 is an enlarged view of one drive shaft illustrated in FIG. 9.

FIG. 10 is an enlarged view of one drive shaft J3 illustrated in FIG. 9. In the drive shaft J3 illustrated in FIG. 10, a plurality of gears 1 to 4 and a reduction gear 5 are arranged between a servomotor 9 and the robot arm 101. The servomotor 9 is composed of a motor body 8 and a brake unit 7 integral with the motor body 8.

When the robot 100 is operated, position control is performed by driving the motor body 8 while releasing the brake unit 7. When the robot 100 needs to be urgently stopped, for example, in the case of risk avoidance, a power outage, or a failure, the drive shaft J3 is braked by using the brake unit 7.

In FIG. 9, one brake unit 7 is incorporated in the servomotor 9. In Japanese Laid-open Patent Publication No. 2009-95939, one brake unit and one additional brake unit are serially incorporated in a servomotor, thereby increasing a braking force.

However, when the brake unit 7 itself does not work in a conventional art, a robot 100 cannot be safely braked. In such a case, as illustrated in FIG. 9, the robot arm 101 rotates around a drive shaft J3 downward due to gravity. This may damage peripherals due to the weight of the robot arm 101 or may damage peripherals when a workpiece W slides from a handpiece 102.

In the configuration disclosed in Japanese Laid-open Patent Publication No. 2009-95939, an additional brake unit is arranged to cut in a power transmission path for a drive shaft. For this reason, even in cases in which an additional brake unit needs to be removed when the additional brake unit does not work or when the additional brake unit is not necessary, a robot cannot be driven in a state in which the additional brake unit is removed. Moreover, a replacement work of the additional brake unit is complicated.

Two brake units can be incorporated in the servomotor. However, in this case, the servomotor has a special structure, which increases the cost of the servomotor. Further, when one of the two brake units does not work, the one brake unit alone cannot be replaced.

The present invention has been made under such circumstances, and an object of the present invention is to provide a safe industrial robot to which an easily replaceable brake unit is additionally attached without cutting in a power transmission path.

SUMMARY OF THE INVENTION

In order to achieve the object described above, according to a first embodiment, there is provided an industrial robot comprising a drive shaft in which a power transmission unit is arranged between a servomotor and a power output unit, comprising: a first brake unit integrally incorporated in the servomotor; and a second brake unit which is connected to the power transmission unit to branch to a power transmission path of the power transmission unit, wherein the drive shaft is braked by using both the first brake unit and the second brake unit.

According to a second aspect, in the first aspect, each of the first brake unit and the second brake unit individually has a function of braking the drive shaft.

According to a third aspect, in the first aspect, the industrial robot further comprises: a first control circuit for the first brake unit; and a second control circuit for the second brake unit.

These objects, features, and advantages of the present invention and other objects, features, and advantages thereof will be made clearer from the detailed description of a typical embodiment of the present invention shown in the accompanying drawings.

DETAILED DESCRIPTION OF THE INVENTION

Embodiments of the present invention will now be described with reference to accompanying drawings. Throughout the drawings below, the same reference numerals are used to refer to the same elements. For easier understanding, the drawings are provided in different scales as needed.

Figure 1:
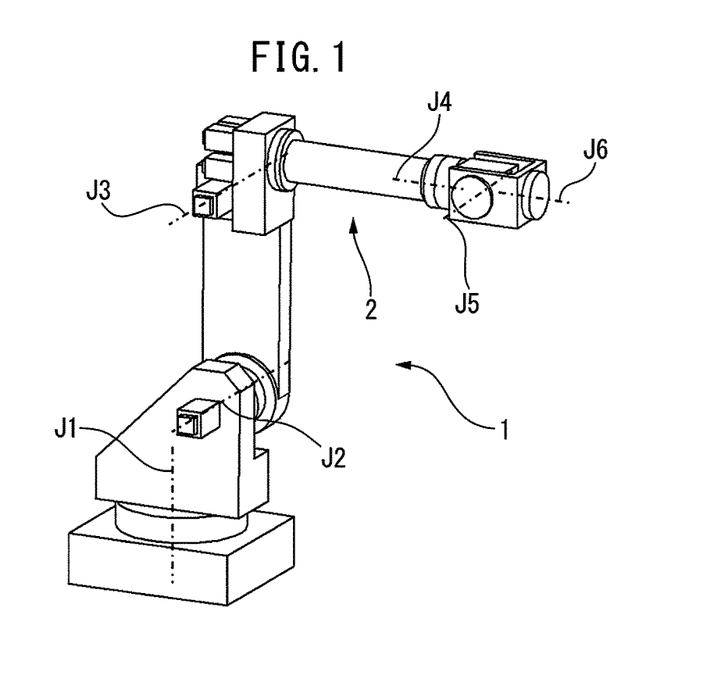
FIG. 1 is a perspective view of an industrial robot based on the present invention.

FIG. 1 is a perspective view of an industrial robot based on the present invention. FIG. 1 illustrates a robot 1 provided with a plurality of joints such as 6-axis vertically articulated robot. The robot 1 is controlled by the below-mentioned control device 30. The robot 1 is provided with six joints, which can perform a rotation or twist operation through corresponding drive shafts J1 to J6.

Figure 2:
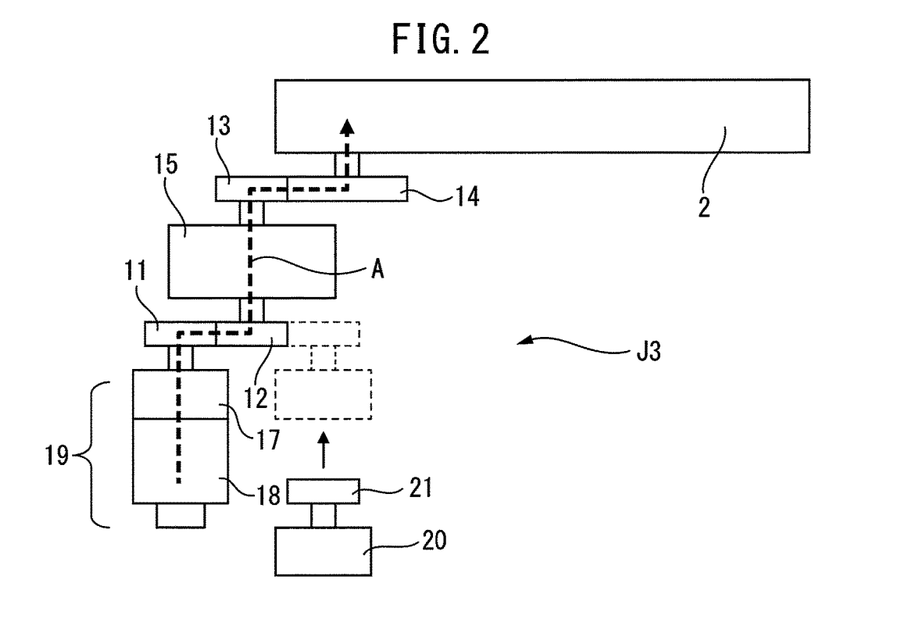
FIG. 2 is an enlarged view of one drive shaft in a first embodiment of the present invention.

FIG. 2 is an enlarged view of one drive shaft in a first embodiment of the present invention. FIG. 2 illustrates the drive shaft J3 representing the drive shafts J1 to J6. In FIG. 2, a servomotor 19 is composed of a motor body 18 and a first brake unit 17 integral with the motor body 18.

As illustrated in FIG. 2, a first gear 11 is attached to an output shaft of the servomotor 19. A second gear 12 is provided on one side of a reduction gear 15 arranged between the servomotor 19 and a robot arm 2; and a third gear 13 is provided on the other side of the reduction gear. The above-mentioned first gear 11 is engaged with the second gear 12 of the reduction gear 15. A fourth gear 14 attached to the robot arm 2 is engaged with the third gear 13 of the reduction gear 15. Hereinafter, the first gear 11 to the fourth gear 14 and the reduction gear 15 may be collectively referred to as "a power transmission unit".

FIG. 2 illustrates a power transmission path A extending from the motor body 18 of the servomotor 19 to the robot arm 2. A power generated by the motor body 18 is transmitted to the robot arm 2 through the power transmission path A to drive the robot arm 2. The robot arm 2 may thus also be referred to as "a power output unit".

In the first embodiment illustrated in FIG. 2, a second brake unit 20 provided with an additional gear 21 is arranged to be engaged with the second gear 12. In other words, in the first embodiment, both the first gear 11 and the additional gear 21 are engaged with the second gear 12. The first gear 11 and the additional gear 21 are preferably arranged flush with each other. Such a configuration makes it possible to use both the first brake unit 17 and the second brake unit 20 when braking the motor body 18.

As can be seen from FIG. 2, the second brake unit 20 is connected to a power transmission unit to branch to the power transmission path A. The second brake unit 20 thus does not have an influence on driving of the robot 1, and the robot 1 can be driven even when the second brake unit 20 is removed. For this reason, the second brake unit 20 can be attached and removed independently of driving of the robot 1. Therefore, even when the second brake unit 20 does not work, only the second brake unit 20 can be easily replaced.

Referring to FIG. 1 again, the drive shaft J3 extends horizontally. Since a robot in the present invention comprises both the first brake unit 17 and the second brake unit 20, even when one brake unit does not work, the other brake unit works; and therefore, the robot arm 2 does not rotate around the drive shaft J3 downward due to gravity. This can thus avoid sliding of the workpiece W and at the same time prevent damage of peripherals. Therefore, the present invention can provide a safe industrial robot 1. This can secure operator's safety, contributing to maintaining the amount of products in a factory.

As can be seen from FIG. 1, other drive shafts J2 and J5 of the industrial robot 1 extend horizontally. Therefore, these drive shafts J2 and J5 are influenced by gravity. For this reason, the drive shafts J2 and J5 are preferably provided with the above-mentioned second brake unit 20. Therefore, downward rotation of the robot arm 2 around the drive shaft J2 or J5 due to gravity is avoided, thereby attaining a similar effect as above.

Naturally, other drive shafts J1, J4, and J6 which are not necessarily horizontal may be provided with the second brake unit 20. According to the application of the robot 1, at least one of the drive shafts J1 to J6 may be provided with the second brake unit 20; and alternatively, all of the drive shafts J1 to J6 may be provided with the second brake unit 20. Further, a plurality of second brake units 20 may be arranged on one of the drive shafts.

Incidentally, as described in the description of the related art, when a first brake unit and a second brake unit are incorporated in a servomotor, the servomotor has a special structure, which increases the cost of the servomotor. Further, even when one of the two brake units does not work, the one brake unit alone cannot be replaced.

However, since the second brake unit 20 of the present invention is not affected by the shape of the servomotor 19, a general-purpose brake unit can be employed as the second brake unit 20, which reduces the cost thereof. For example, in FIG. 2, by changing the outer diameter of the additional gear 21 of the second brake unit 20, the second brake unit 20 can be applied to a drive shaft having a variety of sizes. Further, by changing the number of teeth of the additional gear 21 of the second brake unit 20, the speed ratio can also be adjusted. Therefore, the brake torque of the second brake unit 20 needs not be changed, and an optimal braking force with respect to the drive shaft of the robot 1 can also be obtained.

Incidentally, the second brake unit 20 for itself has a sufficient function for braking the motor body 18. For this reason, even when one of the brake units 10 and 20 does not work, the robot 1 can surely be braked by using the other brake unit 20 or 10. When one of the brake units does not work, the brake unit can be replaced in a state in which the drive shaft of the robot 1 is braked by the other brake unit. The brake units 10 and 20 can thus be replaced safely.

Figure 3:
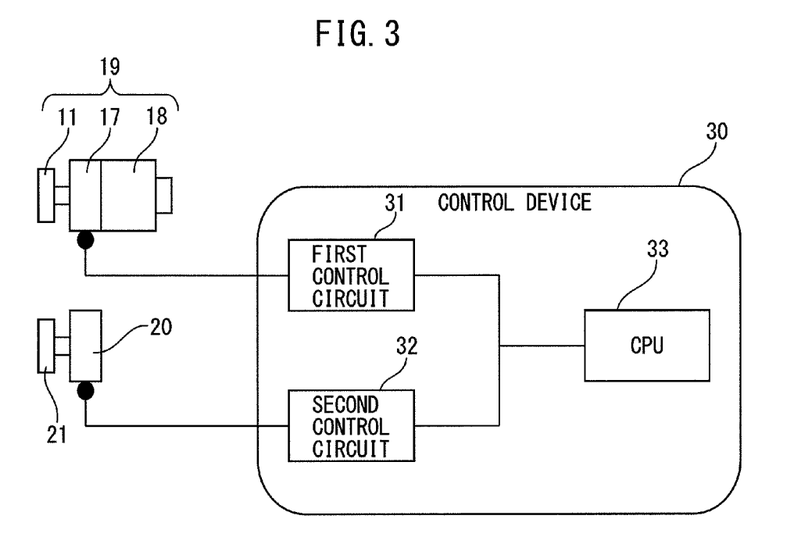
FIG. 3 is a block diagram partially illustrating a control device of an industrial robot based on the present invention.

FIG. 3 is a block diagram partially illustrating a control device of an industrial robot based on the present invention. FIG. 3 illustrates a control device 30 which controls the robot 1, and a servomotor 19 and a second brake unit 20 in one drive shaft J3 are connected to the control device 30. Although not illustrated in FIG. 3, other drive shafts are similar to the above.

As illustrated in FIG. 3, the control device 30 contains a CPU33, and the CPU33 is connected to the first control circuit 31 and the second control circuit 32. The first control circuit 31 controls braking operation of the first brake unit 17, and the second control circuit 32 controls braking operation of the second brake unit 20. Therefore, in the present invention, even when one of the control circuits 31 and 32 does not work, thereby failing to brake, driving action of the motor body 18 can be braked, by utilizing the other control circuit 32 or 31, by corresponding brake unit 20 or 17. Therefore, it will be found that braking action of the robot 1 can be safely controlled in the present invention.

Figure 4:
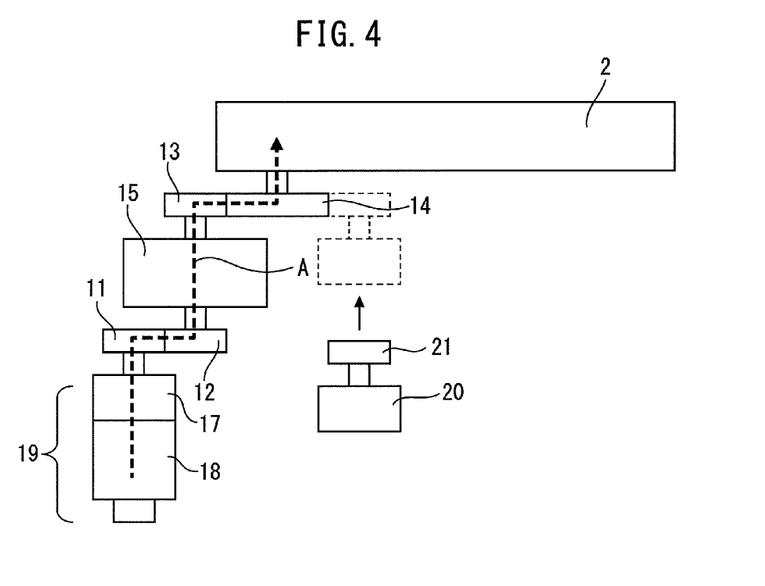
FIG. 4 is an enlarged view of one drive shaft in a second embodiment of the present invention.
Figure 5:
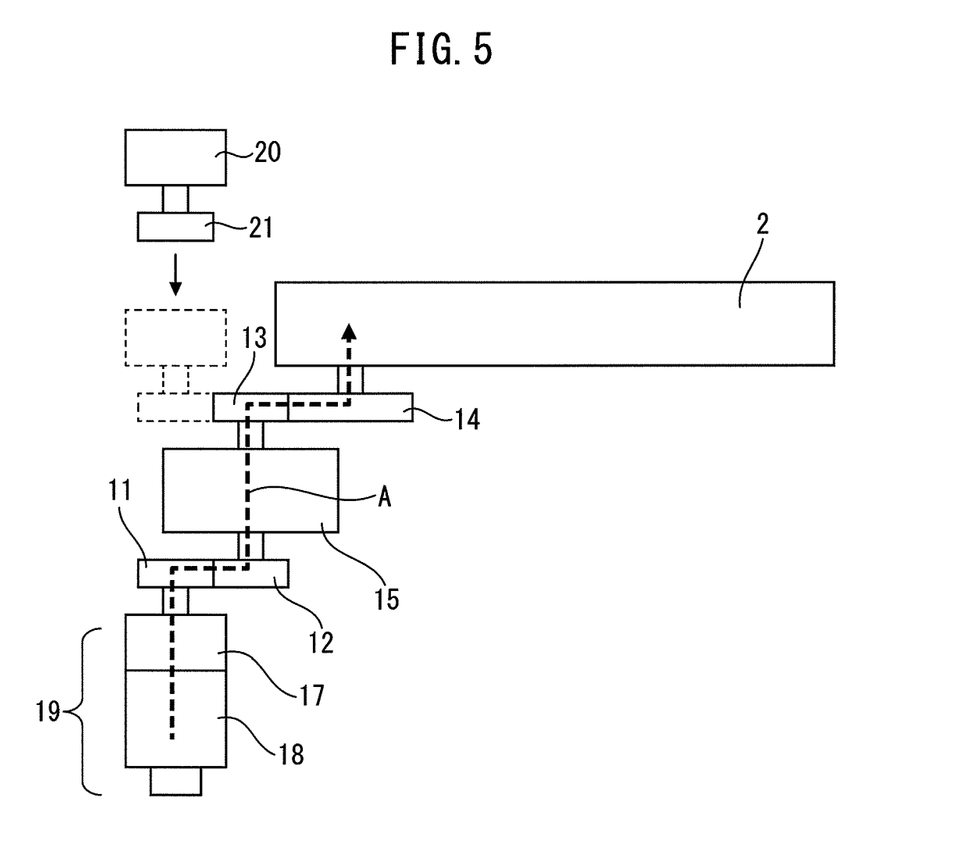
FIG. 5 is an enlarged view of one drive shaft in a third embodiment of the present invention.

As mentioned above, the second brake unit 20 does not affect driving of the robot 1. Therefore, in the present invention, the second brake unit 20 may be arranged anywhere between the first gear 11 and the fourth gear 14 of the power transmission unit. FIG. 4 is an enlarged view of one drive shaft in a second embodiment of the present invention. In FIG. 4, the second brake unit 20 is arranged such that the additional gear 21 is engaged with the fourth gear 14. In FIG. 5 which is an enlarged view of one drive shaft in a third embodiment of the present invention, the second brake unit 20 is arranged such that the additional gear 21 is engaged with the third gear 13. It will be obvious to those skilled in the art that a similar effect as mentioned above can be obtained also in the second and third embodiments. The second brake unit 20 may be arranged with respect to each of the second gear 12, the third gear 13, and the fourth gear 14.

Incidentally, when a power transmission unit contains gears as illustrated in FIG. 2, etc., lubricating oil is needed for the gears. However, the lubricating oil reaches the first brake unit 17 and the second brake unit 20, such a brake unit does not work in some cases.

Figure 6:
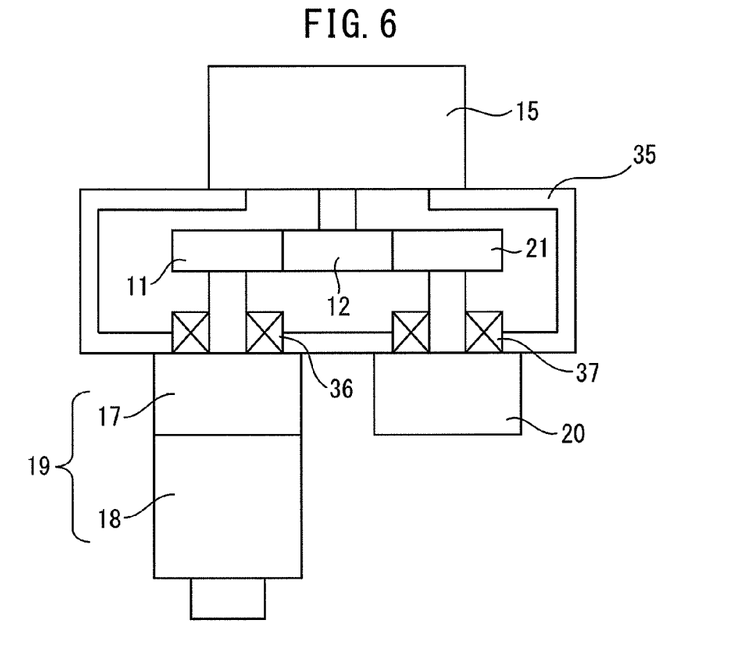
FIG. 6 is a partially enlarged view of FIG. 2.

In this connection, FIG. 6 is a partially enlarged view of FIG. 2. As illustrated in FIG. 6, in the present invention, a region between a reduction gear 15 and the first brake unit 17 and a region between the reduction gear and the second brake unit 20 are included in a housing 35. For this reason, the first gear 11, the second gear 12, and the additional gear 21 are positioned in the housing 35. The housing 35 is filled with lubricating oil. In addition, a first seal element 36 and a second seal element 37 are arranged on the rotation shaft of the first gear 11 and the rotation shaft of the additional gear 21, respectively.

In the present invention, since the first brake unit 17 and the second brake unit 20 are provided with seal elements 36 and 37, respectively, lubricating oil in housing 35 is less likely to reach the first brake unit 17 and the second brake unit 20 at the same time; and therefore, a risk that these brake units do not work at the same time can be reduced.

Figure 7:
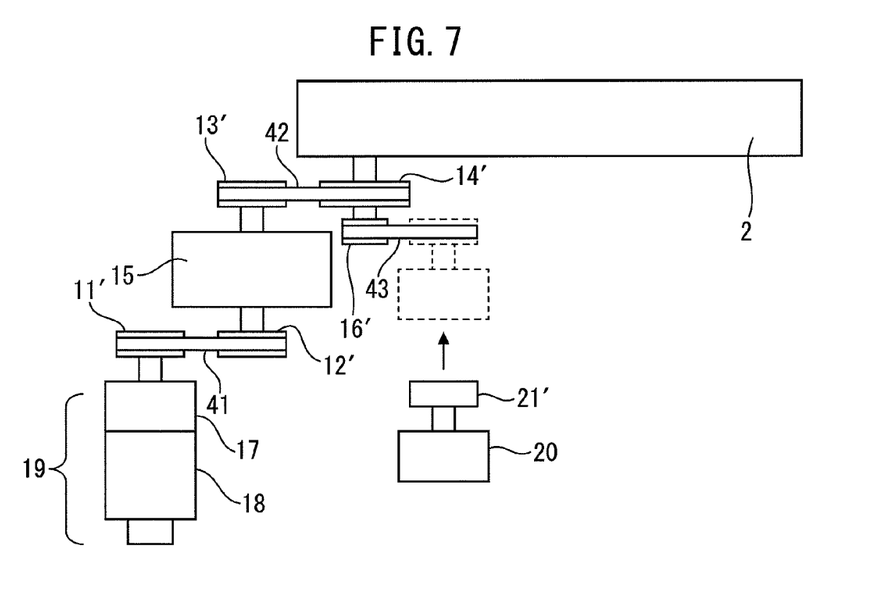
FIG. 7 is an enlarged view of one drive shaft in another embodiment of the present invention.

FIG. 7 is an enlarged view of one drive shaft in another embodiment of the present invention. In FIG. 7, a power of the servomotor 19 is transmitted to the robot arm 2 by pulleys and belts in place of gears. In other words, a first pulley 11' is attached to an output shaft of the servomotor 19. In addition, a second pulley 12' is provided on one side of the reduction gear 15 arranged between the servomotor 19 and the robot arm 2, and a third pulley 13' is provided on the other side thereof.

As illustrated in FIG. 7, a first belt 41 is wound around the first pulley 11' and the second pulley 12'. Further, a second belt 42 is wound around a fourth pulley 14' attached to the robot arm 2 and the third pulley 13' of the reduction gear 15.

Further, in FIG. 7, a fifth pulley 16' is arranged coaxially with the fourth pulley 14'. In addition, a third belt 43 is wound around the fifth pulley 16' and an additional pulley 21' of the second brake unit 20.

In another embodiment illustrated in FIG. 7, the third pulley 13' is engaged with the fourth pulley 14' via the second belt 42, and at the same time, the additional pulley 21' is engaged, via the third belt 43, with a fifth pulley 16' which is coaxial with the fourth pulley 14'. For this reason, when the motor body 18 is braked, both the first brake unit 17 and the second brake unit 20 can be used.

Also in another embodiment illustrated in FIG. 7, the second brake unit 20 does not affect driving of the robot 1, and even when the second brake unit 20, the robot 1 can be driven. Therefore, it will be found that an effect similar to the above can be obtained.

Figure 8:
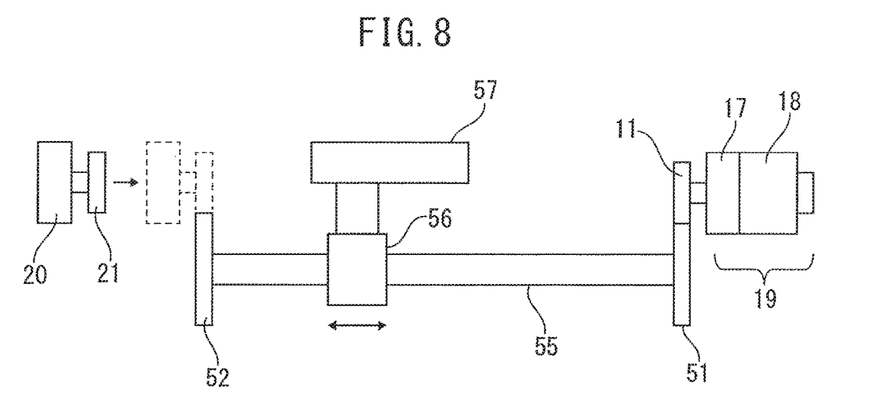
FIG. 8 is an enlarged view of one linear motion shaft in another industrial robot or machine tool.

FIG. 8 is an enlarged view of one linear motion shaft in another industrial robot or machine tool. In FIG. 8, a power of the servomotor 19 is transmitted to a table 47 by using a ball screw. For this reason, the configuration illustrated in FIG. 8 is applied by a machine tool or an industrial robot different from the one in FIG. 1.

In FIG. 8, gears 51 and 52 are attached to both ends of a screw 55 of the ball screw. A table 57 is joined to a nut 56 which is screwed to the screw 55. A robot arm in place of the table 57 may be joined to the nut 56.

In FIG. 8, a first gear 11 of the servomotor 19 is engaged with one gear 51 of the screw 55. An additional gear 21 of the second brake unit 20 is engaged with the other gear 52 of the screw 55. Therefore, the screw 55 is engaged with both the first gear 11 and the additional gear 21 via the gears 51 and 52. Due to such a configuration, both the first brake unit 17 and the second brake unit 20 can be used when the motor body 18 is braked.

Also in FIG. 8, the second brake unit 20 does not affect driving of the table 57, and the table 57 can be driven even when the second brake unit 20 is removed. Therefore, it will be found that a similar effect to the above can be attained. Further, even when a power transmission unit of another type other than a ball screw or belt/pulley is adopted, the present invention can be applied.

ADVANTAGEOUS EFFECT OF INVENTION

In the first aspect, since a robot comprises both the first brake unit and the second brake unit, even when one brake unit does not work, the robot arm does not rotate around the drive shaft downward due to gravity, which can thus avoid sliding of the workpiece and at the same time prevent damage to peripherals. Therefore, the present invention can provide a safe industrial robot. Since the second brake unit is connected to a power transmission unit so as not to cut in the power transmission path and so as to branch to a power transmission path, the second brake unit can be attached and removed independently. Therefore, the second brake unit can be easily replaced.

In the second aspect, even when one of the brake units does not work, the robot can safely be braked. When one of the brake units does not work, the brake unit can be replaced in a state in which the drive shaft of the robot is braked by the other brake unit. The brake units can thus be replaced safely.

In the third aspect, even when one of the control circuits does not work, thereby failing to brake, braking action of the robot can be safely controlled.

While the present invention has been described using the typical embodiments, it will be understood by those skilled in the art that the above-described changes and other various changes, omissions, and additions can be made without departing from the scope of the present invention.

The invention claimed is:

1. An industrial robot comprising a first drive shaft in which a power transmission unit is arranged between a servomotor and a power output unit, comprising:
   a first brake unit integrally incorporated in the servomotor, the first brake unit operatively coupled to the first drive shaft;
   a first gear engaged to an output shaft of the servomotor;
   a second gear engaged with the first gear and is arranged as a part of the power transmission unit;
   a second brake unit not incorporated in the servomotor, the second brake unit connected to the power transmission unit to branch to a power transmission path of the power transmission unit by an additional gear engaged with the second gear at a position which is different from that of the first gear, and
   a housing in which the first gear, the second gear, and the additional gear are positioned and the housing is filled with lubricating oil;
   wherein the first drive shaft is braked by using either the first brake unit or the second brake unit and the first drive shaft of the industrial robot can be operated even if the second brake is removed.

2. The industrial robot according to claim 1, wherein each of the first brake unit and the second brake unit individually has a function of braking the drive shaft.

3. The industrial robot according to claim 1, further comprising: a first control circuit for the first brake unit; and a second control circuit for the second brake unit.

4. The industrial robot according to claim 1, further comprising a first seal element and a second seal element which are arranged on positions where the rotation shaft of the first gear and the rotation shaft of the additional gear, respectively, penetrate a wall of the housing.

* * * * *